July 7, 1970  M. KAPLAN ET AL  3,519,443
CAPILLARY TYPE INK AND INSTRUMENTS USING THE SAME
Filed Nov. 9, 1966
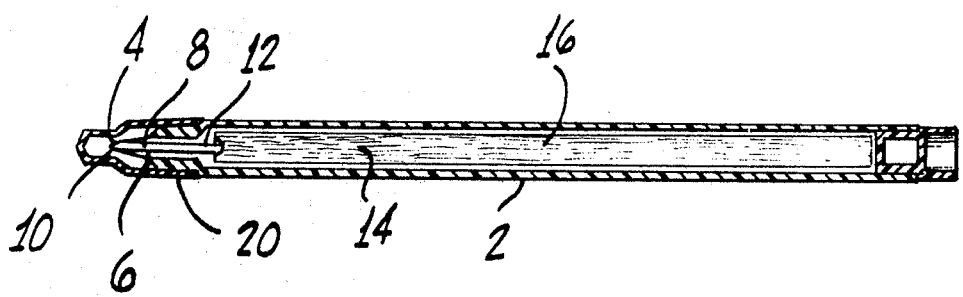
INVENTORS
MEYER KAPLAN &
NORMAN MELNICK
BY *Sperry and Zoda*
ATTORNEYS

United States Patent Office 3,519,443
Patented July 7, 1970

3,519,443
CAPILLARY TYPE INK AND INSTRUMENTS USING THE SAME
Meyer Kaplan, Edison, and Norman Melnick, Highland Park, N.J., assignors to Chemolene Company, Inc., Bordentown, N.J., a corporation of New Jersey
Filed Nov. 9, 1966, Ser. No. 593,182
Int. Cl. C09d 11/00
U.S. Cl. 106—22      12 Claims

ABSTRACT OF THE DISCLOSURE

Capillary type inks particularly adapted for use in writing instruments and characterized by their quick drying properties and their limited penetration of bond paper when used while the inks are further characterized by being resistant to evaporation on exposure to the atmosphere. The ink comprises a solution of a dye in a liquid medium having a viscosity within the limits of about 0.6 to 200 centipoises at 25° C. and containing at least 10% by weight of formamide.

---

This invention relates to novel types of ink which are characterized by their high capillarity and ability to remain exposed to the atmosphere for long periods of time without undue evaporation or adverse change in character. Such inks are particularly adapted for use in capillary type writing instruments such as fountain pens and those pens or marking devices which have fiber, felt or porous plastic type writing points which may remain uncapped and exposed to the air for long periods of time. The inks also may be used on stamp pads and for other purposes wherein prolonged exposure to the atmosphere may occur.

The inks heretofore used in capillary type writing instruments have ordinarily been of the two general types—namely, water base inks containing water soluble dyes, and inks which contain organic solvents and dyes which are soluble in an organic medium. However, both types of inks as heretofore produced have been unsatisfactory for many purposes. Thus, most water soluble dyes tend to fade and are not very light permanent. While it is found that water base inks do not penetrate through ordinary bond or writing paper, the ink tends to bleed or smear when water is applied or when it is subjected to the action of high humidity, perspiration and the like. Those inks containing organic solvents and dyes soluble therein are generally more permanent and do not tend to smear. However, such inks tend to penetrate through paper so that any writing will appear on the opposite side of the sheet with the result that it is not possible to write on both sides of the paper and information on the reverse side of the sheet may be obscured.

A further and most important objection to both water base inks and those inks which contain organic agents resides in the fact that when exposed to the atmosphere, as when a capillary type writing instrument or fountain pen is left uncapped for some time, one or more of the organic solvents or the water may evaporate so as to change the composition of the ink. The tip of the writing instrument will then dry out and its capillaries will become clogged or the dye may be precipitated in the tip so that the writing becomes irregular. In some cases, the composition of the ink may be so changed that it will not flow at all through the capillaries of the instrument and it becomes immpossible to use the same. Attempts have been made to retard the excessive rate at which inks containnig solvents such as methanol, ethanol, toluene, water and the like, will dry out by adding to the inks, agents such as ethylene glycol, propylene glycol and other higher molecular weight compounds. However, such added agents tend to increase the viscosity of the ink to such an extent that it will not flow freely through the capillaries or pores of capillary type writing instruments and the selective evaporation of more volatile constituents of the ink may cause the ink to be thickened in the exposed tip of the instrument. Furthermore, such added agents are poor solvents for the dyes most suitable for use in writing inks and as a result, the dyes tend to precipitate from solution upon evaporation of the more volatile constituents of the ink in or adjacent to the exposed tip of a capillary type writing instrument, stamp pad or the like.

In accordance with the present invention, new types of inks have been developed which possess unique qualities as to their capillarity and resistance to evaporation so that continuous and free flow thereof is assured when the inks are used in brush, fiber, felt and fountain types of capillary writing instruments or on stamp pads. The writing tip and pores or capillaries of such pens do not dry out or become clogged even when subjected to long exposure to the atmosphere. The preferred inks embodying the present invention are further characterized by their remarkable ability to limit penetration of the ink into the paper so that the writing or marking will not appear on the opposite side of the sheet. The dyes employed in producing such inks are of the organic soluble type and as a result, they are more permanent and lightfast, they will not wash off with water and do not smear or blot under the influence of water, moisture or perspiration. Nevertheless, in some instances, and for certain purposes, inks embodying the present invention may contain water soluble dyes if it should be desirable to permit the ink to be removed from clothing, wallpaper or other surfaces which have been marked thereby.

In order to attain these advantages in the production of capillary type writing inks in accordance with the present invention, the liquid constituents of the ink include a significant amount and preferably at least 10% of formamide and the dyes contained in the ink are those dyes which are soluble in organic solvents although in some instances, as noted above, water soluble dyes may be used. The liquid employed may be formamide alone, but in some instances, it is also desirable to include various modifying agents in the ink composition to alter the properties thereof and to render the inks particularly suitable for various uses and ⸜applications in capillary type writing instruments, stamp pads or the like.

Accordingly, the principal objects of the present invention are to provide novel inks adapted for use in capillary types of writing instruments; to decrease the tendency of capillary type writing instruments to clog or dry out when exposed to the atmosphere; and to provide capillary type writing inks which are characterized by their permanence, water resistance, and ability to be used on bond paper without penetrating through the paper to the opposite side thereof.

A specific object of the present invention is to provide permanent, non-penetrating inks for use in capillary type writing instruments and the like wherein the liquid constituents of the ink includes formamide and the inks are characterized by their low viscosity, high surface tension and their ability to dry quickly on paper while remaining liquid and substantially unchanged in composition at the writing tip or nib of a writing instrument or on the surface of a stamp pad.

Another object of the invention is to provide inks whose markings can be washed off with water, that will not penetrate paper, that will dry quickly on paper, but will dry slowly on the writing tip.

Another object of the invention is to provide capillary type writing instruments adapted for use with inks characterized by their high capillarity and low viscosity.

These and other objects and features of the present invention will appear from the following description thereof wherein typical and preferred compositions and formulations are described for the purpose of indicating the nature of the invention but without intending to limit the scope of the invention thereby.

The drawing is a longitudinal sectional view through a typical capillary type writing instrument embodying the present invention.

Successful and consistent operation of fountain pens and those pens or marking devices which have a fiber or felt writing tip or surface is dependent primarily upon the capillary flow of ink to the point which engages the paper or surface. Therefore, the ink used in such writing instruments must be sufficiently fluid or possess and preserve such capillarity as to assure free and consistent flow thereof through the capillary passages or pores extending from a reservoir to the writing tip. These advantages are attained in accordance with the present invention by formulating the ink so that it will have a viscosity below about 200 centipoises at 25° C. and preferably in the range of about 0.6 to 40 centipoises at 20° C. Further, since the user of such writing instruments or pads may, and frequently does, fail to place a cap or closure over the exposed tip or surface of the pen or instrument when it is not in use, it is also necessary for the ink to be of such a character that it will not dry out, or undergo adverse change in its composition or physical properties upon exposure to the air and will not become excessively thickened adjacent to the point or precipitate the dye used in the pores or capillaries adjacent to the exposed tip or surface.

In order to impart such properties to the ink and at the same time provide an ink which is permanent, non-fading, and water resistant, the applicants employ a liquid medium composed of, or including, formamide, and having water insoluble, lightfast dyes dissolved therein. While various other organic solvents and mixtures, or mixtures thereof with water may be used, it has been discovered that in order to prevent the ink from penetrating through bond paper to appear on the reverse side of the paper, it is necessary for the ink to contain at least 10% of formamide. Nevertheless, if it is desired to produce a type of ink embodying the present invention, which is capable of being washed off a surface, water soluble dyes of a type which are soluble in formamide or mixtures of formamide and water may be used.

The unique ability of formamide to be absorbed or to penetrate only into the surface of bond paper, without penetrating through the paper to appear on the reverse side thereof, is not clearly understood, but appears to be related to its very high surface tension. While formamide may be used by itself as the fluid constituent of the ink and solvent for the dye employed, other liquids or solvents for the dyes may be used and in some instances, polar solvents or agents such as those polyhydric alcohols which are characterized by their relatively low viscosity and high surface tension or capillarity may be used in the ink compositions.

The added agents which may be used in the formamide ink composition have been found to be those polar organic agents, and preferably polyhydric alcohols, which have a surface tension within the range of about 20 to 60 dynes per square centimeter and preferably above about 40 dynes, and are also characterized by a viscosity less than about 200 centipoises and preferably in the range of about 1 to 40 centipoises at 20° C. Typical of such agents are mono- and di-alkyl ethers of ethylene glycol, glycerol and ethylene glycol, although other agents such as benzyl alcohol, furfural, and chorophenol and the like may be used if desired.

The amount of the added polar agents, when used, may equal from about 5% to 90% of the liquid employed in the ink but generally does not exceed about 60% of the total composition.

It is also possible to use water in the ink composition, especially when it is desired to produce a type of ink which is "washable" so that it can be removed from a surface to which it has been applied. Water soluble dyes and as much as 90% of water can be used in such ink compositions, provided the balance of the liquid is predominantly formamide, whereby the ink will possess the distinguishing property permitting the tip of a writing instrument to be exposed for long periods of time without drying out or adversely affecting the properties of the ink.

The dyes used in producing inks in accordance with the present invention may be any of the conventional or desired permanent dyes which are soluble in organic agents such as azo, diazo, phthalocyanine, or ferrocyanide types of dyes. However, those water soluble dyes such as the triaryl methane type of dyes may be used. The amount of dye used will of course vary with the nature and color of the ink to be produced and may constitute from about 0.5 to 10% of the total ink composition.

In some instances, wetting agents may be added to the ink composition and for this purpose, either cationic, anionic or non-ionic wetting agents may be employed in amounts up to about 0.5% may be used. Typical of such wetting agents are the arylalkyl sulfonates, alkylphenolethylene oxide condensation products, morpholineoleate, and the like.

The inks are produced by the simple operation of mixing and dissolving the ingredients in any suitable way but for ease in producing the mixture the dye may first be dissolved in a suitable solvent, such as a portion of the formamide used, and this solution may be added to the remaining formamide or mixture of liquid constituents employed in forming the ink. If desired, the liquid may be warmed to facilitate the solution of the dye in the liquid constituents of the ink.

In order to illustrate typical and preferred ink compositions embodying the present invention, the following examples are cited.

EXAMPLE I 3 parts by weight of the dye known as "Du Pont Spirit Soluble Blue CH" (Color Index Solvent Blue 56) and 3 parts by weight of a dye known as "Du Pont Luxol Fast Blue MBSN (Color Index Solvent Blue 38) were dissolved in 100 parts of formamide, whereby an ink was obtained having a dark blue color and a surface tension of about 58 dynes per square centimeter and a viscosity of about 3.75 centipoises at 25° C.

This ink was charged into a capillary type writing instrument having a writing tip formed of closely packed synthetic fiber strands and used to write on uncalendered 9 pound bond paper. The writing was sharp, distinct and dark blue in color, had superior light fastness and dried instantly so that it would not smear or smudge when rubbed with the finger shortly after writing. There was no penetration whatever of the ink through the paper to the opposite side thereof and when the sheet was placed under a running stream of water, there was no blurring or washing out of the ink with the result that the writing retained its clear, sharp and original appearance on the sheet.

The pen used in producing the writing as described above was placed uncapped and in an oven at 130° F. for one week to dry out and when removed from the oven was immediately used to produce writing as easily, clearly and continuously as when first employed in carrying out the tests described above.

EXAMPLE II

Other alternative ink compositions were produced having the following formulations:

| | Parts by weight |
|---|---|
| Formamide | 100 |
| Ethylene glycol | 100 |
| Methyl alcohol | 20 |
| Dye | 12 |

EXAMPLE III

| | Parts by weight |
|---|---|
| Formamide | 100 |
| Ethylene glycol | 5 |
| Propylene glycol | 5 |
| Wetting agent | 0.1 |
| Dye | 2 |

EXAMPLE IV

| | Parts by weight |
|---|---|
| Formamide | 100 |
| Benzyl alcohol | 10 |
| Dye | 4 |

EXAMPLE V

| | Parts by weight |
|---|---|
| Formamide | 20 |
| Ethylene glycol | 80 |
| Dye | 4 |

EXAMPLE VI

| | Parts by weight |
|---|---|
| Formamide | 100 |
| Ethylene glycol | 80 |
| Water | 20 |
| Dye | 10 |

EXAMPLE VII

| | Parts by weight |
|---|---|
| Formamide | 100 |
| Ethylene glycol | 60 |
| Water | 5 |
| Dye | 3 |

EXAMPLE VIII

| | Parts by weight |
|---|---|
| Formamide | 100 |
| Propylene glycol | 40 |
| Water | 8 |
| Dye | 2 |

EXAMPLE IX

| | Parts by weight |
|---|---|
| Formamide | 30 |
| Water | 70 |
| Dye | 5 |

EXAMPLE X

| | Parts by weight |
|---|---|
| Formamide | 20 |
| Ethylene glycol | 10 |
| Water | 70 |
| Dye | 5 |

All of the ink compositions set forth in Examples II to X were tested as set forth in Example I above. None of them penetrated through the paper and all were characterized by their resistance to drying when left exposed to the air at an elevated temperature for long periods of time. Furthermore, all of the inks had a viscosity well below 200 centipoises at 20° C. and a surface tension within the range of 10 to 60 dynes per square centimeter.

The inks of Examples IX and X contained water soluble dyes and were capable of being washed off the paper upon vigorous scrubbing with soap or a detergent dissolved in water.

In order to demonstrate the remarkable and unique characteristics of ink compositions embodying the present invention, additional ink compositions were produced wherein other organic agents were substituted for formamide. Thus an ink composition corresponding to that of Example I above had the following composition:

EXAMPLE XI

| | Parts by weight |
|---|---|
| Methanol | 100 |
| Spirit Soluble Blue CH | 3 |
| Luxol Fast Blue MBSN | 3 |

Additional compositions corresponding to those of Examples I and XI were produced wherein ethanol, n-propanol, isopropanol and n-butanol were substituted for the formamide of Example I. With each of such ink compositions, wherein some other organic agent was substituted for formamide of Example I, it was found that the ink penetrated through the paper so as to appear on the opposite side of the sheet. Furthermore, when a writing instrument containing such ink was left uncapped, it would not write after 24 hours' exposure to the air in the case of the composition of Example XI, wherein methanol was substituted for formamide, and even when the other alcohols cited above were substituted for the formamide of Example I, the ink on the tip of the pen dried up in a day or two when exposed to the atmosphere so that the capillary type writing instrument was rendered unusuable. Such alternative compositions are therefore fundamentally different in character from the ink of Example I which does not penetrate through paper and can be left in an uncapped writing instrument for several months and yet write as clearly and effectively as new, after such exposure.

Further ink composition similar to that of Example X were produced wherein formamide was omitted and a corresponding amount of ethylene glycol substituted therefor. Such a composition had the following formula:

EXAMPLE XII

| | Parts by weight |
|---|---|
| Ethylene glycol | 30 |
| Water | 70 |
| Dye | 5 |

Other similar ink compositions corresponding to Examples X and XII wherein propylene glycol, various polyethylene glycols and polypropylene glycols were employed, in the absence of formamide, were also produced and tested. In each case, writing instruments containing such ink when left uncapped would cease to write after exposure to the air for three weeks.

The characteristic advantages of ink compositions embodying the present invention cannot be explained on the basis of the higher boiling point of formamide as compared with the substituted organic solvents, as will be apparent from a comparison of the ink compositions of Examples IX, X and XII. Thus each of the latter ink compositions contains the same amount (30%), of a relatively high boiling organic agent—the boiling point of ethylene glycol actually being 5° C. higher than that of formamide. However, pens filled with the ink of Example XII ceased to write when left uncapped for three weeks whereas those pens containing the ink compositions of Examples IX and X were still writing after being left uncapped for 10 weeks. The unique and characteristic advantages of the ink compositions of the present invention are thus clearly attributable to some peculiar and, as yet, unexplainable property of formamide, as a constituent of capillary type ink compositions.

In order to illustrate a typical writing instrument embodying the present invention, the drawing consists of a longitudinal sectional view through a capillary pen of the type wherein there is an outer barrel or shell 2 having a tip 4 which has a tubular neck 6 fitting frictionally within the end of barrel 2. The tip 4 has a group of closely packed writing fibers 8 carried thereby and projecting from the end of the tip as shown at 10 to form a writing point. However, the rear end 12 of the fibers 8 extend inwardly from the neck 6 of the tip 4 into abutting and ink receiving engagement with the adjacent end of an ink supplying cartridge 14. The fibers 12 then serve as wicking means to draw ink from the cartridge 14 by capillary action and to conduct the ink through the tip 4 of the pen to the projecting fibrous writing tip 10 of the fibers 8.

Any suitable or preferred form of cartridge 14 may be used but as shown, it preferably consists of a bundle of loosely packed longitudinally extending nylon or other fibers, which may, if desired, be bonded together while leaving a multitude of fine capillaries, pores or channels 16 extending longitudinally thereof to feed ink by a capillary action from the channels 16 to the end 12 of the writing fibers 8. The high capillary and low viscosity ink employed in accordance with the present invention substantially fills the channels and capillary passages 16 of the cartridge 14 and since the capacity of such passages 16 is relatively great, the cartridge serves to maintain and continuously supply the high capillary ink to the writing tip 10 of the writing fibers 8.

In any event, upon insertion of the tip 4 with its inwardly extending wicking fibers 12 into contact with the adjacent end of the cartridge 14, the writing fibers promptly draw the ink through the bundle of writing fibers 8 to the writing tip 10 of the pen.

The pen or writing instrument is therefore ready for almost instant use and in any event, because of the non-drying qualities of the ink and its high capillarity, the pen will continue to be available and capable of immediate and unvarying use, even though the cap or closure is left off the pen for long periods of time. Nevertheless, in order to prevent the pen from marking or staining clothing when carried in the pocket, it is usual to provide a cap 20 for the pen to fit over and protect the tip 4 and writing tip 10 of the pen from contact with other objects.

It is, of course, possible to provide a writing instrument with a cartridge which is simply a container for liquid ink (with no fibers therein) and to meter the ink to a nib or writing point by capillary action with or without some valve means. Further, in the alternative, the capillary writing tip of the writing instrument may be formed of porous material, such as plastic, felt or the like, or may be of the type used in fountain pens.

The form, style and type of pen, brush, writing instrument, inking pad or the like employed in using the writing ink of the present invention may of course be otherwise varied as desired, and the type, color and composition of formamide containing inks characterized by the high capillarity, low viscosity, high surface tension and unchanging properties are also capable of wide variation.

In view thereof, it should be understood that the particular constructions, compositions and formulations of the ink shown, described and set forth above are cited by way of illustration only and are not intended to limit the scope of the invention.

We claim:
1. An ink composition adapted for use in a capillary type writing instrument and consisting of .5–10% by weight of a dye in a liquid medium, said liquid medium consisting essentially of from about 10% to 100% of formamide, the remainder, if any, of said liquid medium being water or an organic polar liquid having a viscosity such that the viscosity of the total ink composition containing the same will be within the limits of about 0.6 to 200 centipoises at 25° C. and the surface tension of the total ink composition containing the same will be within the limits of about 20 to 60 dynes per square centimeter.

2. An ink composition as defined in claim 1 which is characterized by the fact that when applied by a capillary type writing instrument it does not penetrate through bond paper.

3. An ink composition as defined in claim 1 wherein the major portion of the liquid medium is formamide.

4. An ink composition as defined in claim 1 wherein at least 90% of the liquid medium is formamide.

5. An ink composition as defined in claim 1 wherein the dye is soluble in formamide and relatively insoluble in water.

6. An ink composition as defined in claim 1 wherein the liquid medium contains water and a water soluble dye.

7. An ink composition as defined in claim 1 wherein said composition contains an organic polar solvent consisting of a polyhydride alcohol.

8. An ink composition as defined in claim 1 wherein said composition contains up to 90% of water 9. An ink composition as defined in claim 1 wherein said composition contains a surfactant in an amount not exceeding about 0.5% of the composition.

10. An ink composition as defined in claim 1 containing from about 1 to 90% of water 11. An ink composition adapted for use in capillary type writing instruments and consisting of a solution of a water insoluble permanent dye in a liquid medium consisting essentially of from about 20% to 90% of formamide, from about 1 to 80% of a polar solvent selected from the group consisting of ethylene glycol, propylene glycol, glycerine, benzyl alcohol, furfural and chlorophenol; from 0 to 0.5% of a wetting agent, and from 0 to 20% of water, said composition having a surface tension of from about 10 to 60 dynes per square centimeter, a viscosity not exceeding about 200 centipoises, and being characterized by the fact that it does not penetrate bond paper.

12. An ink composition as defined in claim 11 containing from about 0.5 to 10% by weight based upon the weight of the total ink composition of a dye soluble in said liquid medium.

References Cited

UNITED STATES PATENTS

| 2,130,807 | 9/1938 | Magill et al. | 106—24 |
| 2,525,433 | 10/1950 | Voet | 106—30 |
| 2,684,909 | 7/1954 | Leekley et al. | 106—24 |
| 2,690,973 | 10/1954 | Voet | 106—30 XR |
| 2,933,403 | 4/1960 | Toulmin | 106—22 |

DONALD J. ARNOLD, Primary Examiner

J. B. EVANS, Assistant Examiner

U.S. Cl. X.R.

106—23, 308; 117—121.2; 252—425.5